United States Patent [19]

Yoon

[11] Patent Number: 4,581,399

[45] Date of Patent: Apr. 8, 1986

[54] METHOD FOR THE MELT PROCESSING OF THERMOTROPIC LIQUID CRYSTAL POLYMERS

[75] Inventor: Hyun-Nam Yoon, Summit, N.J.

[73] Assignee: Celanese Corporation, New York, N.Y.

[21] Appl. No.: 430,910

[22] Filed: Sep. 30, 1982

[51] Int. Cl.$^4$ ................................................ D01F 6/88
[52] U.S. Cl. .................................... 524/246; 264/171; 264/176 F; 264/210.6; 264/211; 264/331.21; 264/349; 524/240; 524/255; 524/258
[58] Field of Search .................................... 521/61–64; 524/41, 539, 601, 246, 255, 240, 258; 264/176 F, 210.6, 331.21, 349, 171, 211

[56] References Cited

U.S. PATENT DOCUMENTS

| | | | |
|---|---|---|---|
| 3,381,058 | 4/1968 | Caldwell et al. | 524/41 |
| 3,386,795 | 6/1968 | Caldwell et al. | 264/211 |
| 3,759,870 | 9/1973 | Economy et al. | 264/331.21 |
| 3,778,410 | 12/1973 | Kuhfuss et al. | 264/331.21 |
| 4,196,066 | 4/1980 | Inata et al. | 264/236 |
| 4,267,289 | 5/1981 | Froix | 524/539 |
| 4,267,304 | 5/1981 | Feasey et al. | 528/193 |
| 4,346,197 | 8/1982 | Crano et al. | 264/176 R |
| 4,416,839 | 11/1983 | Imata et al. | 264/209.1 |
| 4,419,308 | 12/1983 | Matsumura et al. | 264/209.1 |
| 4,429,104 | 1/1984 | Feasey | 264/236 |
| 4,460,736 | 7/1984 | Froix et al. | 264/331.21 |

FOREIGN PATENT DOCUMENTS

| | | | |
|---|---|---|---|
| 263315 | 8/1967 | Australia | 264/211 |
| 53-51247 | 5/1978 | Japan | 325/444 |
| 56-166038 | 12/1981 | Japan | 264/331.12 |

*Primary Examiner*—Jeffery Thurlow
*Attorney, Agent, or Firm*—Burns, Doane, Swecker & Mathis

[57] ABSTRACT

An improved method is provided for the melt processing of thermotropic liquid crystal polymers. An improvement in the melt processing (e.g., fiber spinning) of thermotropic liquid crystal polymers is obtained if minor amounts of a low molecular weight liquid crystalline compound are added to the melt. Improvements in spinning temperatures, take-up speed and spinning pressure are observed.

43 Claims, No Drawings

METHOD FOR THE MELT PROCESSING OF THERMOTROPIC LIQUID CRYSTAL POLYMERS

BACKGROUND OF THE INVENTION

The present invention relates to a process for the extrusion of melt processable thermotropic liquid crystalline polymers. The process provides for improved processability of the liquid crystalline polymer.

Melt processable liquid crystalline polymers are well-known in the art. These polymers may exhibit very high melting temperatures and hence must be processed at inconveniently high temperatures and pressures. Moreover, prolonged exposure to high temperatures commonly causes degradation of the polymer and results in the production of shaped articles having relatively poor properties. The use of high pressures is inconvenient and expensive and is desirably avoided.

It is known to admix a liquid crystalline polymer with other liquid crystalline or non-liquid crystalline polymers in order to improve the melt processability thereof. See, for example, European Patent Application Ser. No. 0 030 417; and British Patent Application Ser. Nos. 8017685; 8035800; and 8116381; and commonly-assigned U.S. Pat. No. 4,267,289.

SUMMARY OF THE INVENTION

In accordance with the present invention there is thus provided an improved method for the extrusion of melt processable liquid crystalline polymers wherein such polymers are extruded at elevated temperatures to provide a shaped article, the improvement comprising extruding a blend comprised of a major amount of the liquid crystalline polymer and a minor amount of a liquid crystalline compound which has a molecular weight of less than about 1000 and which is capable of forming an anisotropic melt phase at the extrusion temperature.

In accordance with the present invention there is also provided an improved melt processable blend comprised of a major amount of liquid crystalline polymer which is capable of forming an anisotropic melt phase and a minor amount of a liquid crystalline compound of a molecular weight of less than 1000 and which compound is capable of forming an anisotropic melt phase under conditions at which said blend may be melt processed.

In accordance with the present invention there are also provided molded and extruded articles comprised of the blend of the present invention.

DETAILED DESCRIPTION OF THE INVENTION

It has been discovered that the melt processability of thermotropic liquid crystalline polymers can be significantly improved by admixing therewith a minor amount of a low molecular weight liquid crystalline compound which is capable of forming an anisotropic melt at the melt processing conditions employed. Improvements in the melt processing include lower melt temperatures and pressures as well as increased take-up speed for extruded filaments.

Thermotropic liquid crystal polymers are polymers which are liquid crystalline (i.e., anisotropic) in the melt phase. These polymers have been described by various terms, including "liquid crystalline," "liquid crystal" and "anisotropic". Briefly, the polymers of this class are thought to involve a parallel ordering of the molecular chains. The state wherein the molecules are so ordered is often referred to either as the liquid crystal state or the nematic phase of the liquid crystalline material. These polymers are prepared from monomers which are generally long, flat and fairly rigid along the long axis of the molecule and commonly have chain-extending linkages that are either coaxial or parallel.

Such polymers readily form liquid crystals (i.e., exhibit anisotropic properties) in the melt phase. Such properties may be confirmed by conventional polarized light techniques whereby crossed polarizers are utilized. More specifically, the anisotropic melt phase may be confirmed by the use of a Leitz polarizing microscope at a magnification of 40X with the sample on a Leitz hot stage and under nitrogen atmosphere. The polymer is optically anisotropic; i.e., it transmits light when examined between crossed polarizers. Polarized light is transmitted when the sample is optically anisotropic even in the static state.

Thermotropic liquid crystal polymers include but are not limited to wholly and non-wholly aromatic polyesters, aromatic-aliphatic polyesters, aromatic polyazomethines, aromatic polyester-carbonates and aromatic and non-wholly aromatic polyester-amides.

The aromatic polyesters and polyester-amides are considered to be "wholly" aromatic in the sense that each moiety present in the polymer contributes at least one aromatic ring to the polymer backbone and which enable the polymer to exhibit anisotropic properties in the melt phase. Such moieties may be derived from aromatic diols, aromatic amines, aromatic diacids and aromatic hydroxy acids. Moieties which may be present in the thermotropic liquid crystal polymers employed in the present invention (wholly or non-wholly aromatic) include but are not limited to the following:

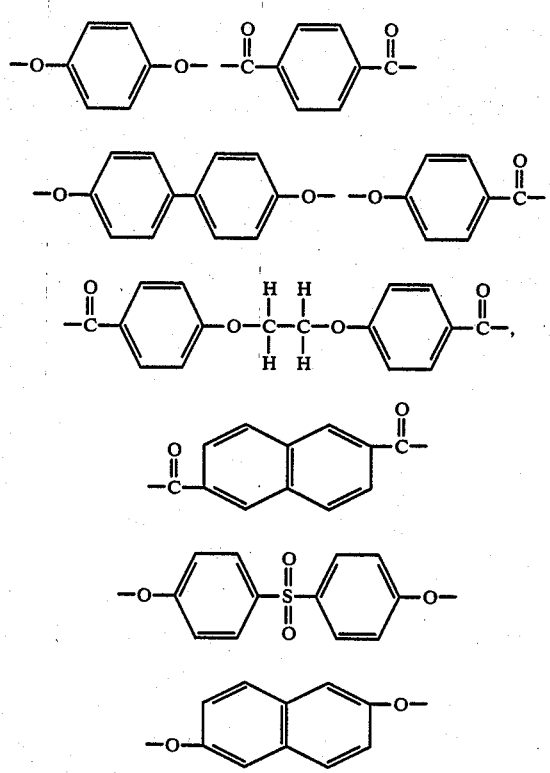

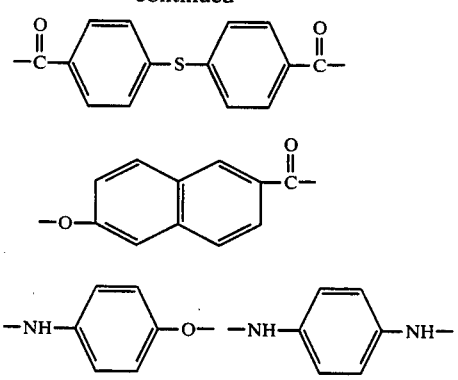

Preferably, the thermotropic liquid crystal polymers which are employed comprise not less than about 10 mole percent of recurring units which include a naphthalene moiety. Preferred naphthalene moieties include 6-oxy-2-naphthoyl, 2,6-dioxynaphthoyl and 2,6-dicarboxynaphthoyl.

Specific examples of aromatic-aliphatic polyesters are copolymers of polyethylene terephthalate and hydroxybenzoic acid as disclosed in *Polyester X7G-A Self Reinforced Thermoplastic,* by W. J. Jackson, Jr. H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymers can be found in "Liquid Crystal Polymers: I. Preparation and Properties of p-Hydroxybenzoic Acid Copolymers," *Journal of Polymer Science, Polymer Chemistry Edition,* Vol. 14, pp. 2043–58 (1976), by W. J. Jackson. Jr., and H. F. Kuhfuss. The above-cited references are herein incorporated by reference in their entirety.

Aromatic polyazomethines and processes of preparing the same are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrolo-2-methyl-1,4-phenylenenitrolomethylidyne-1,4-phenylene-methylidyne); and poly(nitrolo-2-chloro-1,4-phenylenenitrilomethyldyne-1,4-phenylene-methylidyne).

Aromatic polyester-carbonates are disclosed in U.S. Pat. Nos. 4,107,143 and 4,284,757, and U.S. patent application Ser. No. 319,024, filed Nov. 6, 1981 (now U.S. Pat. No. 4,371,660), which are herein incorporated by reference in their entirety. Exampies or such polymers include those consisting essentially of p-oxybenzoyl units, p-dioxyphenyl units, dioxycarbonyl units, and terephthoyl units.

Aromatic polyester-amides and processes of preparing the same are disclosed in U.S. Pat. No. 4,182,842. Further disclosure of such copolymers can be found in "Liquid Crystal Polymers: III Preparation of Properties of Poly(Ester-Amides) from p-Aminobenzoic Acid and Poly(Ethylene Terephthalate)," *Journal of Applied Polymer Science,* Vol. 25, pp. 1685–1694 (1980), by W. J. Jackson, Jr., and H. F. Kuhfuss. The above-cited references are herein incorporated by reference in their entirety.

The liquid crystal polymers which are preferred for use in the present invention are the thermotropic wholly aromatic polyesters. Recent publications disclosing such polyesters include (a) Belgian Pat. Nos. 828,935 and 828,936, (b) Dutch Pat. No. 7505551, (c) West German Pat. Nos. 2,520,819, 2,520,820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,146,702; 4,153,779; 4,156,070; 4,159,365; 4,169,933; 4,181,792; 4,188,476; 4,226,970; 4,201,856; 4,232,143; 4,232,144; 4,245,082; and 4,238,600; and (f) U. K. Application No. 2,002,404.

Wholly aromatic polymers which are preferred for use in the present invention include wholly aromatic polyesters and polyester-amides which are disclosed in commonly-assigned U.S. Pat. Nos. 4,067,852; 4,083,829; 4,130,545; 4,161,470; 4,184,996; 4,219,461; 4,238,598; 4,238,599; 4,230,817; 4,256,624; 4,244,433; 4,279,803; 4,299,756; 4,330,457; 4,339,375; and 4,337,191; and in commonly-assigned U.S. application Ser. Nos. 251,625 and 251,629, each filed Apr. 6, 1981 (now U.S. Pat. Nos. 4,351,917 and 4,351,918) respectively; and 251,818 and 251,819, filed Apr. 7, 1981 (now U.S. Pat. Nos. 4,341,688 and 4,355,132) respectively. The disclosure of all of the above identified commonly-assigned U.S. Patents and applications are herein incorporated by reference in their entirety. The wholly aromatic polyesters and polyester-amides disclosed therein typically are capable of forming an anisotropic melt phase at a temperature below approximately 400° C., and preferably below approximately 350° C.

The thermotropic liquid crystal polymers including wholly aromatic polyesters and polyester-amides which are suitable for use in the present invention may be formed by a variety of ester-forming techniques whereby organic monomer compounds possessing functional groups which, upon condensation, form the requisite recurring moieties are reacted. For instance, the functional groups of the organic monomer compounds may be carboxylic acid groups, hydroxyl groups; ester groups, acyloxy groups, acid halides, amine groups, etc. The organic monomer compounds may be reacted in the absence of a heat exchange fluid via a melt acidolysis procedure. They, accordingly, may be heated initially to form a melt solution of the reactants with the reaction continuing as said polymer particles are suspended therein. A vacuum may be applied to facilitate removal of volatiles formed during the final stage of the condensation (e.g., acetic acid or water).

Commonly-assigned U.S. Pat. No. 4,083,829, entitled "Melt Processable Thermotropic Wholly Aromatic Polyester," describes a slurry polymerization process which may be employed to form the wholly aromatic polyesters which are preferred for use in the present invention. According to such a process, the solid product is suspended in a heat exchange medium. The disclosure of this patent has previously been incorporated herein by reference in its entirety. Although that patent is directed to the preparation of wholly aromatic polyesters, the process may also be employed to form polyester-amides.

When employing either the melt acidolysis procedure or the slurry procedure of U.S. Pat. No. 4,083,829, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided. When polyester-amides are to be formed, an amine group may be provided as lower acyl amide.

Representative catalysts which optionally may be employed in either the melt acidolysis procedure or in the slurry procedure of U.S. Pat. No. 4,083,829 include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters and polyester-amides suitable for use in the present invention tend to be substantially insoluble in common polyester solvents and accordingly are not susceptible to solution processing. As discussed previously, they can be readily processed by common melt processing techniques. Most suitable wholly aromatic polymers are soluble in pentafluorophenol to a limited extent.

The wholly aromatic polyesters which are preferred for use in the present invention commonly exhibit a weight average molecular weight of about 2,000 to 200,000, and preferably about 10,000 to 50,000, and most preferably about 20,000 to 25,000. The wholly aromatic polyester-amides which are preferred for use in the present invention commonly exhibit a molecular weight of about 5,000 to 50,000, and preferably about 10,000 to 30,000; e.g., 15,000 to 17,000. Such molecular weight may be determined by gel permeation chromatography and other standard techniques not involving the solutioning of the polymer; e.g., by end group determination via infrared spectroscopy on compression molded films. Alternatively, light scattering techniques in pentafluorophenol solution may be employed to determine the molecular weight.

The wholly aromatic polyesters and polyester-amides additionally commonly exhibit an inherent viscosity (i.e., I.V.) of at least approximately 2.0 dl./g., e.g., approximately 2.0 to 10.0 dl./g., when dissolved in a concentration of 0.1 percent by weight in pentafluorophenol at 60° C.

For the purposes of the present invention, the aromatic rings which are included in the polymer backbones of the polymer components may include substitution of at least some of the hydrogen atoms present upon an aromatic ring. Such substituents include alkyl groups of up to four carbon atoms; alkoxy groups having up to four carbon atoms; halogens; and additional aromatic rings, such as phenyl and substituted phenyl. Preferred halogens include fluorine, chlorine and bromine. Although bromine atoms tend to be released from organic compounds at high temperatures, bromine is more stable on aromatic rings than on aliphatic chains, and therefore is suitable for inclusion as a possible substituent on the aromatic rings.

Especially preferred wholly aromatic polyesters and polyester-amides are those which are disclosed in above-noted U.S. Pat. Nos. 4,161,470, 4,184,996, 4,219,461, 4,256,624, 4,238,599 and 4,330,457, with the polyesters disclosed in U.S. Pat. No. 4,161,470 being most preferred.

The wholly aromatic polyester which is disclosed in U.S. Pat. No. 4,161,470 is a melt processable wholly aromatic polyester capable of forming an anisotropic melt phase at a temperature below approximately 350° C. The polyester consists essentially of the recurring moieties I and II wherein:

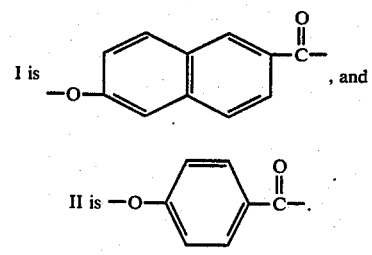

The polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,184,996 is a melt processable wholly aromatic polyester capable of forming an a isotropic melt phase at a temperature below approximately 325° C. The polyester consists essentially of the recurring moieties I, II and III wherein:

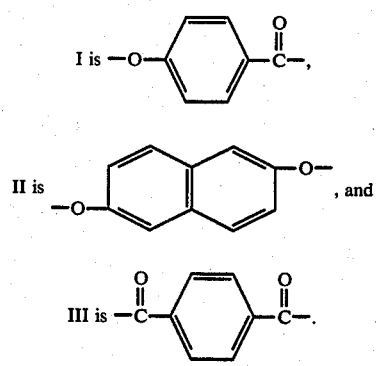

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

The wholly aromatic polyester which is disclosed in U.S. Pat. No. 4,238,599 is a melt processable polyester capable of forming an anisotropic melt phase at a temperature no higher than approximately 320° C. consisting essentially of the recurring moieties I, II, III and IV wherein:

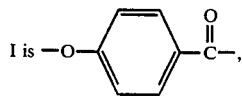

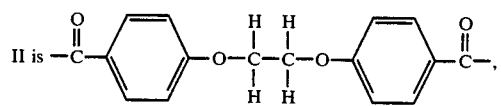

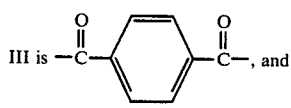

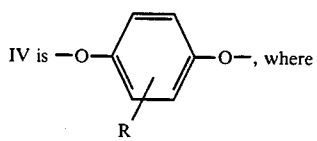

R is methyl, chloro, bromo, or mixtures thereof, and is substituted for a hydrogen atom present upon the aromatic ring, and wherein said polyester comprises approximately 20 to 60 mole percent of moiety I, approximately 5 to 18 mole percent of moiety II, approximately 5 to 35 mole percent of moiety III, and approximately 20 to 40 mole percent of moiety IV. The polyester preferably comprises approximately 35 to 45 mole percent of moiety I, approximately 10 to 15 mole percent of moiety II, approximately 15 to 25 mole percent of moiety III, and approximately 25 to 35 mole percent of moiety IV, with the proviso that the total molar concentration of moieties II and III is substantially identical to that of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof. This wholly aromatic polyester commonly exhibits an inherent viscosity of at least 2.0 dl./g., e.g., 2.0 to 10.0 dl./g., when dissolved in a concentration of 0.1 weight volume percent in pentafluorophenol at 60° C.

The polyester disclosed in U.S. Pat. No. 4,219,461 is a melt processable wholly aromatic polyester which is capable of forming an anisotropic melt phase at a temperature below approximately 320° C. The polyester consists essentially of the recurring moieties I, II, III and IV wherein:

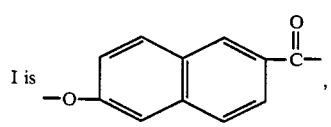

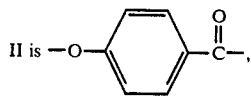

III is a dioxy aryl moiety of the formula —O—Ar—O— wherein Ar is a divalent radical comprising at least one aromatic ring, and IV is a dicarboxy aryl moiety of the formula

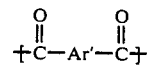

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV. The polyester preferably comprises approximately 20 to 30 (e.g., approximately 25) mole percent of moiety I, approximately 25 to 40 (e.g., approximately 35) mole percent of moiety II, approximately 15 to 25 (e.g., approximately 20) mole percent of moiety III and approximately 15 to 25 (e.g., approximately 20) mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties III and IV are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, non-symmetrical moieties, such as those derived from resorcinol and isophthalic acid, may also be used.

Preferred moieties III and IV are set forth in above-noted U.S. Pat. No. 4,219,461. The preferred dioxy aryl moiety III is:

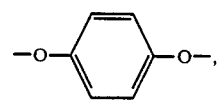

and the preferred dicarboxy aryl moiety IV is:

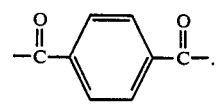

The polyester disclosed in U.S. Pat. No. 4,256,624 is a melt processable wholly aromatic polyester which is capable of forming an anisotropic melt phase at a temperature below approximately 400° C. The polyester consists essentially of the recurring moieties I, II, and III wherein:

I is 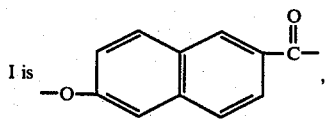,

II is a dioxy aryl moiety of the formula [-O-Ar-O-]where Ar is a divalent radical comprising at least one aromatic ring, and III is a dicarboxy aryl moiety of the formula

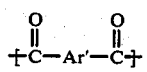

where Ar' is a divalent radical comprising at least one aromatic ring, and wherein the polyester comprises approximately 10 to 90 mole percent of moiety I, approximately 5 to 45 mole percent of moiety II, and approximately 5 to 45 mole percent of moiety III. The polyester preferably comprises approximately 20 to 80 mole percent of moiety I, approximately 10 to 40 mole percent of moiety II, and approximately 10 to 40 mole percent of moiety III. The polyester more preferably comprises approximately 60 to 80 mole percent of moiety I, approximately 10 to 20 mole percent of moiety II, and approximately 10 to 20 mole percent of moiety III. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Moieties II and III of the polyester described immediately above are preferably symmetrical in the sense that the divalent bonds which join these moieties to other moieties in the main polymer chain are symmetrically disposed on one or more aromatic rings (e.g., are para to each other or diagonally disposed when present on a naphthalene ring). However, nonsymmetrical moieties, such as those derived from resorcinol and isophthalic acid, may also be used.

Preferred moieties II and III are set forth in above-noted U.S. Pat. No. 4,256,624. The preferred dioxy aryl moiety II is:

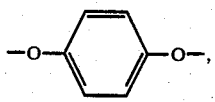

and the preferred dicarboxy aryl moiety III is:

U.S. Pat. No. 4,330,457 discloses a melt processable polyester-amide which is capable of forming an anisotropic melt phase at a temperature below approximately 400° C. The polyesteramide consists essentially of the recurring moieties I, II, III and optionally IV wherein:

I is 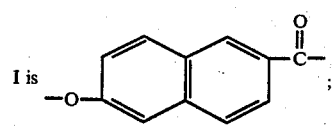;

II is

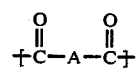

where A is a divalent radical comprising at least one aromatic ring or a divalent trans-cyclohexane radical;

III is $+Y-Ar-Z+$ where Ar is a divalent radical comprising at least one aromatic ring, Y is O, NH, or NR, and Z is NH or NR, where R is an alkyl group of 1 to 6 carbon atoms or an aryl group; and IV is $+O-Ar'-O+$ where Ar' is a divalent radical comprising at least one aromatic ring; and wherein said polyester-amide comprises approximately 10 to 90 mole percent of moiety I, approximately 5 to 45 mole percent of moiety II, approximately 5 to 45 mole percent of moiety III and approximately 0 to 40 mole percent of moiety IV. In addition, at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

Preferred moieties, II, III and IV are set forth in above-noted U.S. Pat. No. 4,330,457. The preferred dicarboxy aryl moiety II is:

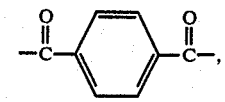

the preferred moiety III is:

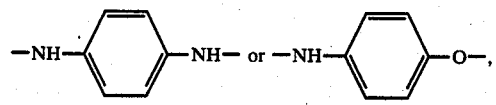

and the preferred dioxy aryl moiety IV is:

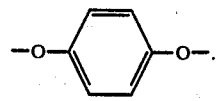

The low molecular weight liquid crystalline compound employed in the method of the present invention has a molecular weight of less than about 1000, and preferably has a molecular weight of less than about 500. Such compounds must also be capable of forming an anisotropic melt phase at the extrusion or melt processing temperatures employed in practice of the invention. Such temperatures will normally range from about 270° C. to 400° C., although the particular temperature employed in the extrusion process may fall outside that range depending upon the characteristics of the specific polymer employed. The compound must also not react chemically with the liquid crystalline polymer in the melt phase.

A major benefit obtainable from the blend of the present invention is that the melt viscosity of the blend is considerably reduced relative to that of the melt-processable polymer alone thereby permitting a lower processing temperature to be used. Blends according to the invention may be produced which enable very substantial reductions in minimum processing temperatures, for example, 30° C. or more, to be achieved.

The low molecular weight compound will generally be employed in the blend in amounts of less than about 50 percent by weight based upon the weight of the blend, and preferably between about 0.1 and 10 percent by weight. Amounts up to about 50 percent by weight may be employed although the use of excessive amounts may detrimentally affect the physical properties of the extruded article. It is thus preferred to employ only an amount of the compound sufficient to provide the desired processing advantages (e.g., viscosity reduction) without use of excessive amounts which adversely affect the extruded product. Generally, the advantages of the present invention can be achieved if the compound is present in an amount less than about 10, and preferably less than about 5 percent by weight, for example, 0.1 to 5 percent by weight.

An exemplary liquid crystalline compound for use in the method of the present invention is N,N'-bis(p-phenylbenzylidene)alpha, alpha'-bi-p-toluidine. The above compound melts at a temperature of about 257° C. and forms an anisotropic melt in the temperature range up to about 400° C.

Other exemplary liquid crystalline compounds suitable for use in the present invention include but are not limited to N,N'-bis(methoxybenzylidene)-alpha, alpha'-p-toluidine which forms an anisotropic melt between 181° C. and 339° C.; N,N'-bis(ethoxybenzylidene)-alpha, alpha'-p-toluidine which forms an anisotropic melt between 173° C. and 341° C.; and N,N'-bis(anisyl-benzylidene)-alpha, alpha'-p-toluidine which forms an anisotropic melt between 253° C. and 370° C.

In preparing the blend of the present invention, the polymer is commonly provided in the form of chips and the plasticizer material in the form of powder. Each of the components is weighed separately, and then the components are physically mixed together in any appropriate apparatus, e.g., a ball mill. The physical mixture is then dried at approximately 100° C. overnight or for a period of time of approximately 24 hours. The mixture is conveniently dried in a vacuum oven or in a circulating air oven, although any suitable apparatus may be used. The purpose of the drying step is to remove water from the physical mixture so as to prevent degradation of the blend. After the mixture of solid particles has been dried, the blend can then be prepared. A convenient method of forming the blend is melt extrusion. The extrusion apparatus thoroughly mixes the components in the melt and then extrudes the blend in the form of a strand which, upon solidification, can be broken up into chips or pellets.

The blend of the present invention demonstrates anisotropy in the melt phase. Thus, the blend retains the excellent processability characteristics of the liquid crystalline polymer. The liquid crystalline compound will readily become uniformly dispersed within the polymer melt to provide a homogeneous melt. The fact that such a homogeneous melt is produced is an important aspect of the present invention sinc it enables uniformity in the extruded product to be achieved which minimizes decreases in physical properties of the product.

The conditions of temperature and pressure under which the blend can be extruded are not critical to the process of the present invention and can easily be determined by one of ordinary skill in the art. Typically, thermotropic liquid crystalline polymers are extruded at a temperature within the range of approximately 270° C. to 400° C. and at a pressure within the range of approximately 100 p.s.i. to 10,000 p.s.i.

The blend can be extruded to form a variety of shaped articles. For example, the blend can be extruded through a die to form a film. It is to be understood that the term "film" as used herein includes any of various thin, flat structures which may be known in the art as a sheet or film, etc. The blend can also be extruded through a spinneret to form a plurality of filaments or can be extrusion molded to form a molded article. The blend is also useful in the extrusion of elongated three-dimensional articles such as rods or pipes.

When the process of the present invention is used in conjunction with the spinning of fibers, the effects of the reduced viscosity of the melt is demonstrated by a increase of as much as 40 percent in take-up speed and a decrease of as much as 55 percent in extrusion pressure. In addition, filaments of finer denier can be formed. Advantageously, under certain conditions, a fiber can be melt spun from the blend at a temperature at which a fiber could normally not be spun from the polymer melt without the liquid crystalline compound being present.

The extrusion apparatus used in conjunction with the method of the present invention is not critical to practice of the invention and may be any conventional extrusion apparatus. Examples of suitable extrusion apparatus are found, for example, in *Plastics Engineering Handbook of the Society of the Plastics Industry, Inc.*, Fourth Edition, edited by Joel Frados, Van Nostrand Reinhold Company (1976), pp. 156–203. For melt spinning, the extrusion apparatus can be supplemented with a take-up device to collect the extrudate.

The blend of the present invention is also useful as a molding resin, and especially for injection molding. Articles molded from the blends of the present invention exhibit good mechanical properties, such as tensile strength, tensile modulus, flexural strength, and heat deflection temperature.

Articles may also be molded from a molding compound which includes, as one component, the blend of the present invention. Such a molding compound incorporates into the blend of the present invention approximately 1 to 50 percent, preferably approximately 10 to 30 percent by weight, based upon the total weight of the molding compound, of a solid filler and/or reinforcing agent. Representative fibers which may serve as reinforcing agents include glass fibers, asbestos, graphitic carbon fibers, amorphous carbon fibers, synthetic polymeric fibers, aluminum fibers, aluminum silicate fibers, aluminum oxide fibers, titanium fibers, magnesium fibers, rock wool fibers, steel fibers, tungsten fibers, cotton, wool, and wood cellulose fibers, etc. Representative filler materials include calcium silicate, silica, clays, talc, mica, polytetrafluoroethylene, graphite, alumina trihydrate, sodium aluminum carbonate, barium ferrite, etc.

In order to form an article by injection molding from the present blend, or from a molding compound made from the present blend, the blend or molding compound is brought to the melt temperature of the blend, e.g., approximately 280° C. to 300° C., and is then injected into a mold cavity. The mold cavity is commonly maintained at a temperature less than approximately 100° C. The blend in its melt phase is injected into the mold cavity at a pressure of approximately 10,000 p.s.i. The cycle time (i.e., the time between injections) for the present blend commonly is about 10 to 40 seconds.

The invention is additionally illustrated in connection with the following Examples which are to be considered as illustrative of the present invention. It should be understood, however, that the invention is not limited to the specific details of the Examples.

EXAMPLE 1

A blend of a liquid crystalline copolymer comprised of 75-mole percent of p-hydroxy benzoyl moieties and 25 mole percent of 6-hydroxy-2-naphthoyl moieties and the liquid crystalline compound N,N'-bis(phenylbenzylidene)-alpha, alpha'-bi-p-toluidene was prepared by physically admixing 15.0 grams of the copolymer with 0.029 grams of the compound (about 0.2 percent by weight based on the blend), grinding the admixture in a ball mill and then blending it in a tumble blender for 40 hours. The physical admixture was then dried at about 130° C. for a period of about 72 hours in a vacuum oven.

The mixture was melt spun using a micromelt spinning unit with a 0.18 mm. diameter spinneret hole. The spinning process could be carried out at a spinning temperature of 310° C. at a throughput rate of about 0.7 grams/minute, a take-up speed of 1000 meters/minute and a spinning pressure drop of 2100 psi.

By way of contrast, when the spinning process was carried out under the same spinning conditions employing only the above-identified polymer without the liquid crystalline compound, the maximum attainable take-up speed was 720 meters/minute and the pressure drop was 4700 psi.

The fiber prepared from the blend essentially retained the mechanical properties of the fibers prepared from the unblended polymer as depicted in Table I:

TABLE I

| Sample | Denier | Tensile Strength (g/d) | Elongation (%) | Initial Modulus (g/d) |
|---|---|---|---|---|
| Blended Polymer | 6.1 | 12.2 | 2.5 | 600 |
| Unblended Polymer | 7.7 | 13.0 | 2.6 | 600 |

EXAMPLE 2

A blend of a copolymer comprised of 40 mole percent of p-hydroxy benzoyl moieties and 60 mole percent of 6-hydroxy- 2-naphthoyl moieties and N,N'-bis(phenyl-benzylidene)-alpha, alpha'-bi-p-toluidene was prepared by physically admixing 18.6 grams of the copolymer and 0.98 grams of the liquid crystalline compound (about 5 percent by weight based on the blend), grinding the admixture in a ballmill and then blending it in a tumble blender for 24 hours. The physical mixture was then dried at about 130° C. for a period of 36 hours in a vacuum oven.

The mixture was melt spun using a micromelt spinning unit with a 0.18 mm diameter spinneret hole at various temperatures to determine the minimum spinning temperature. The minimum spinning temperature for the blend was determined to be 285° C., while the minimum spinning temperature for the unmodified copolymer was determined to be 300° C.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variarions and changes may be made by those skilled in the art without departing from the spirit of the invention.

I claim:

1. In a method for the extrusion of a melt processable liquid crystalline polymer wherein said polymer is extruded at an elevated temperature to provide a shaped article, the improvement comprising extruding a blend comprised of a major amount of the liquid crystalline polymer and a minor amount of a liquid crystalline compound of a molecular weight of less than about 1000 and which is capable of forming an anisotropic melt phase at the extrusion temperature.

2. The method of claim 1 wherein said liquid crystalline polymer is a wholly aromatic polymer.

3. The method of claim 2 wherein said polymer is a wholly aromatic polyester.

4. The method of claim 1 wherein said polymer comprises at least about 10 mole percent of recurring units which include a naphthalene moiety.

5. The method of claim 1 wherein said liquid crystalline compound is capable of forming an anisotropic melt phase at a temperature in the range of about 270 to 400° C.

6. The method of claim 1 wherein said liquid crystalline compound has a molecular weight of less than about 500.

7. The method of claim 1 wherein said liquid crystalline compound is selected from the group consisting of N,N'-bis-(p-phenylbenzylidene)-alpha, alpha'-bi-p-tolui-dine, N'N-bis(methoxybenzylidene)-alpha, alpha'-p-toluidine, N,N'-bis(ethoxybenzylidene)-alpha, alpha'-p-toluidine and N,N'-bis(anisylbenzylidene)-alpha, alpha'-p-toluidine.

8. The method of claim 1 wherein said liquid crystalline compound is present in an amount of less than about 10 percent by weight based on the weight of the blend.

9. The method of claim 8 wherein said compound is present in an amount ranging from about 0.1 to 10 percent by weight based on the weight of the blend.

10. The method of claim 8 wherein said compound is present in an amount ranging from 0.1 to 5 percent by weight based on the weight of the blend.

11. The method of claim 1 wherein said polymer comprises a melt processable wholly aromatic polyester which is capable of forming an anisotropic melt phase and consists essentially of the recurring moieties I, II, and III wherein:

I is 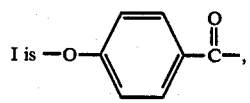,

II is 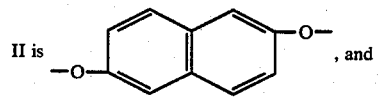, and

-continued

III is , and wherein said polyester comprises approximately 30 to 70 mole percent of moiety I and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

12. The method of claim 11 wherein said polyester comprises approximately 40 to 60 mole percent of moiety I, approximately 20 to 30 mole percent of moiety II, and approximately 20 to 30 mole percent of moiety III.

13. The method of claim 1 wherein said polymer comprises a melt processable wholly aromatic polyester which is capable of forming an anisotropic melt phase and consists essentially of the recurring moieties I and II wherein:

I is 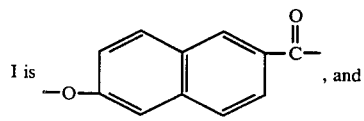, and

II is 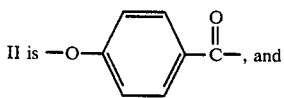, and wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

14. The method of claim 13 wherein said polyester comprises approximately 65 to 85 mole percent of moiety II.

15. The method of claim 13 wherein said polyester comprises approximately 15 to 35 mole percent of moiety II.

16. The method of claim 1 wherein said polymer comprises a melt processable wholly aromatic polyester which is capable of forming an anisotropic melt phase and consists essentially of the recurring moieties I, II, and III wherein:

I is 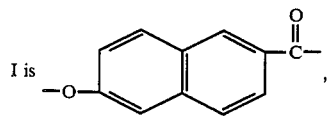,

II is a dioxy aryl moiety of the formula $-\!\!+\!\!O-Ar\!\!+\!\!O-$
where Ar is a divalent radical comprising at least one aromatic ring, and III is a dicarboxy aryl moiety of the formula

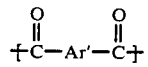

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

17. The method of claim 16 wherein said polyester comprises approximately 20 to 80 mole percent of moiety I, approximately 10 to 40 mole percent of moiety II, and approximately 10 to 40 mole percent of moiety III.

18. The method of claim 1 wherein said polymer comprises a melt processable wholly aromatic polyester which is capable of forming an anisotropic melt phase and consists essentially of the recurring moieties I, II, III and IV wherein:

I is 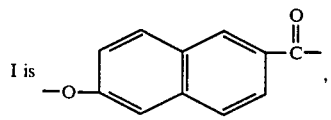,

II is 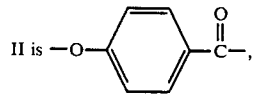,

III is a dioxy aryl moiety of the formula $-\!\!+\!\!O-Ar-O\!\!+\!\!-$ wherein Ar is a divalent radical comprising at least one aromatic ring, and IV is a dicarboxy aryl moiety of the formula

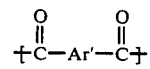

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

19. The method of claim 18 wherein said polyester comprises approximately 20 to 30 mole percent of moiety I, approximately 25 to 40 mole percent of moiety II, approximately 15 to 25 mole percent of moiety III and approximately 15 to 25 mole percent of moiety IV.

20. The method of claim 1 wherein said polymer comprises a melt processable polyester-amide which is capable of forming an anisotropic melt phase and consists essentially of the recurring moieties I, II, III and optionally IV wherein:

I is 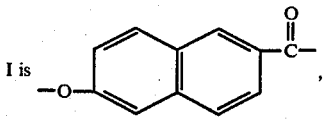

II is 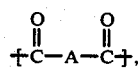

where A is a divalent radical comprising at least one aromatic ring or a divalent transcyclohexane radical;
III is ${-}[Y{-}Ar{-}Z]{-}$, where Ar is a divalent radical comprising at least one aromatic ring, Y is O, NH or NR, and Z is NH or NR, where R is an alkyl group of 1 to 6 carbon atoms or an aryl group; and
IV is ${-}[O{-}Ar'{-}O]{-}$, where Ar' is a divalent radical comprising at least one aromatic ring;
and wherein said polyester-amide comprises approximately 10 to 90 mole percent of moiety I, approximately 5 to 45 mole percent of moiety II, approximately 5 to 45 mole percent of moiety III, and approximately 0 to 40 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

21. An improved melt processable blend comprised of a major amount of a liquid crystalline polymer which is capable of forming an anisotropic melt phase and a minor amount of a liquid crystalline compound of a molecular weight of less than 1000 and which compound is capable of forming an anisotropic melt phase under conditions at which said blend is melt processable.

22. The blend of claim 21 wherein said liquid crystalline polymer is a wholly aromatic polymer.

23. The blend of claim 22 wherein said polymer is a wholly aromatic polyester.

24. The blend of claim 21 wherein said polymer comprises at least about 10 mole percent of recurring units which include a naphthalene moiety.

25. The blend of claim 21 wherein said liquid crystalline compound is capable of forming an anisotropic melt phase at a temperature in the range of about 270° to 400° C.

26. The blend of claim 21 wherein said liquid crystalline compound has a molecular weight of less than about 500.

27. The blend of claim 21 wherein said liquid crystalline compound is selected from the group consisting of N,N'-bis(p-phenylbenzylidene)-alpha, alpha'-bi-p-toluidine, N'N-bis(methoxybenzylidene)-alpha, alpha'-p-toluidine, N,N'-bis(ethoxybenzylidene)-alpha, alpha'-p-toluidine and N,N'-bis(anisylbenzylidene)-alpha, alpha'-p-toluidine.

28. The blend of claim 21 wherein said liquid crystalline compound is present in an amount of less than about 10 percent by weight based on the weight of the blend.

29. The blend of claim 28 wherein said compound is present in an amount ranging from about 0.1 to 10 percent by weight based on the weight of the blend.

30. The blend of claim 28 wherein said compound is present in an amount ranging from about 0.1 to 5 percent by weight based on the weight of the blend.

31. The blend of claim 21 wherein said polymer comprises a melt processable wholly aromatic polyester which is capable of forming an anistropic melt phase and consists essentially of the recurring moieties I, II, and III wherein:

I is 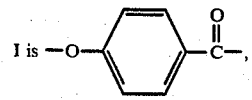,

II is 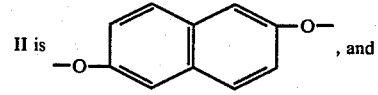, and

III is 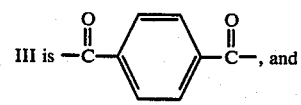, and wherein said polyester comprises approximately 30 to 70 mole percent of moiety I and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

32. The blend of claim 21 wherein said polyester comprises approximately 40 to 60 mole percent of moiety I, approximately 20 to 30 mole percent of moiety II, and approximately 20 to 30 mole percent of moiety III.

33. The blend of claim 21 wherein said polymer comprises a melt processable wholly aromatic polyester which is capable of forming an anisotropic melt phase and consists essentially of the recurring moieties I and II wherein:

I is 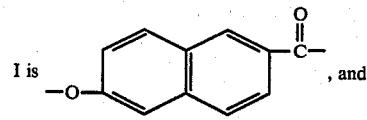, and

II is 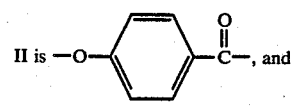, and wherein said polyester comprises approximately 10 to 90 mole percent of moiety I, and approximately 10 to 90 mole percent of moiety II and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

34. The blend of claim 33 wherein said polyester comprises approximately 65 to 85 mole percent of moiety II.

35. The blend of claim 33 wherein said polyester comprises approximately 15 to 35 mole percent of moiety II.

36. The blend of claim 21 wherein said polymer comprises a melt processable wholly aromatic polyester which is capable of forming an anisotropic melt phase and consists essentially of the recurring moieties I, II, and III wherein:

I is 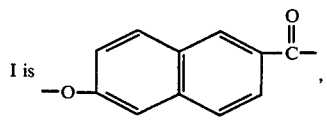,

II is a dioxy aryl moiety of the formula —O—Ar—O— where Ar is a divalent radical comprising at least one aromatic ring, and III is a dicarboxy aryl moiety of the formula

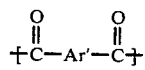

where Ar' is a divalent radical comprising at least one aromatic ring, and wherein said polyester comprises approximately 10 to 90 mole percent of moiety I, approximately 5 to 45 mole percent of moiety II, and approximately 5 to 45 mole percent of moiety III and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

37. The blend of claim 37 wherein said polyester comprises approximately 20 to 80 mole percent of moiety I, approximately 10 to 40 mole percent of moiety II, and approximately 10 to 40 mole percent of moiety III.

38. The blend of claim 21 wherein said polymer comprises a melt processable wholly aromatic polyester which is capable of forming an anisotropic melt phase and consists essentially of the recurring moieties I, II, III and IV wherein:

I is 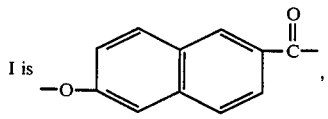,

II is —O—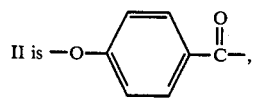,

III is a dioxy aryl moiety of the formula ⫤O—Ar—O⫥ wherein Ar is a divalent radical comprising at least one aromatic ring, and IV is a dicarboxy aryl moiety of the formula

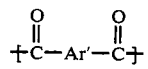

where Ar' is a divalent radical comprising at least one aromatic ring, and wherein the polyester comprises approximately 20 to 40 mole percent of moiety I, in excess of 10 up to about 50 mole percent of moiety II, in excess of 5 up to about 30 mole percent of moiety III, and in excess of 5 up to about 30 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

39. The blend of claim 38 wherein said polyester comprises approximately 20 to 30 mole percent of moiety I, approximately 25 to 40 mole percent of moiety II, approximately 15 to 25 mole percent of moiety III and approximately 15 to 25 mole percent of moiety IV.

40. The blend of claim 21 wherein said polymer comprises a melt processable polyester-amide which is capable of forming an anisotropic melt phase and consists essentially of the recurring moieties I, II, III and optionally IV wherein:

I is 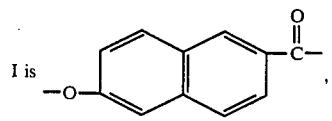,

II is

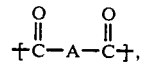, where A is a divalent radical comprising at least one aromatic ring or a divalent transcyclohexane radical;

III is —Y—Ar—Z—, where Ar is a divalent radical comprising at least one aromatic ring, Y is O, NH or NR, and Z is NH or NR, where R is an alkyl group of 1 to 6 carbon atoms or an aryl group; and IV is —O—Ar'—O—, where Ar' is a divalent radical comprising at least one aromatic ring;

and wherein said polyester-amide comprises approximately 10 to 90 mole percent of moiety I, approximately 5 to 45 mole percent of moiety II, approximately 5 to 45 mole percent of moiety III, and approximately 0 to 40 mole percent of moiety IV and wherein at least some of the hydrogen atoms present upon the rings optionally may be replaced by substitution selected from the group consisting of an alkyl group of 1 to 4 carbon atoms, an alkoxy group of 1 to 4 carbon atoms, halogen, phenyl, substituted phenyl, and mixtures thereof.

41. A molded article comprised of the blend of claim 21.

42. An extruded article comprised of the blend of claim 21.

43. The article of claim 42 comprising a fiber or filament.

* * * * *